United States Patent
Linhardt et al.

(10) Patent No.: US 10,678,068 B2
(45) Date of Patent: Jun. 9, 2020

(54) ELECTROCHROMIC CONTACT LENS

(71) Applicant: Verily Life Sciences LLC, Mountain View, CA (US)

(72) Inventors: Jeffrey G. Linhardt, Pleasanton, CA (US); Travis Deyle, San Jose, CA (US); Joshua N. Haddock, Mountain View, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 478 days.

(21) Appl. No.: 14/974,544

(22) Filed: Dec. 18, 2015

(65) Prior Publication Data

US 2017/0176774 A1    Jun. 22, 2017

(51) Int. Cl.
*G02C 7/10* (2006.01)
*G02C 7/04* (2006.01)
*G02F 1/157* (2006.01)
*G02F 1/163* (2006.01)
*G02F 1/155* (2006.01)
(Continued)

(52) U.S. Cl.
CPC ........ *G02C 7/101* (2013.01); *B29D 11/00817* (2013.01); *G02C 7/04* (2013.01); *G02F 1/1333* (2013.01); *G02F 1/153* (2013.01); *G02F 1/155* (2013.01); *G02F 1/157* (2013.01); *G02F 1/163* (2013.01); *B29D 11/00038* (2013.01); *G02C 7/046* (2013.01); *G02C 2202/16* (2013.01); *G02F 1/13306* (2013.01); *G02F 2001/1552* (2013.01)

(58) Field of Classification Search
CPC ........ G02F 1/15–1/163; G02F 2201/44; G02F 1/133305; G02F 1/1333; G09G 3/19; G09G 3/38; G02C 7/083; G02C 7/00; G02C 9/00; G02C 7/101; G02C 7/04; A61F 2/16; A61F 2009/0087; G02B 1/043; B29D 11/00807; B29D 11/00817; B29D 11/0073
USPC ............ 351/159.03, 159.39, 159.02, 159.34, 351/159.66, 159.73, 159.74, 178, 219; 359/227, 241, 265–275, 13; 349/13, 49, 349/105; 356/445; 623/6.17, 6.27; 348/817
See application file for complete search history.

(56) References Cited

U.S. PATENT DOCUMENTS 5,011,582 A * 4/1991 Oshikawa ............ G02F 1/1527
                                                                 205/759
6,214,261 B1 * 4/2001 Smarto ................... B29C 70/76
                                                                 156/107
(Continued)

OTHER PUBLICATIONS

PCT/US2016/061165—International Search Report and Written Opinion, dated Feb. 24, 2017, 14 pages.

*Primary Examiner* — William R Alexander
*Assistant Examiner* — Alberto J Betancourt
(74) *Attorney, Agent, or Firm* — Christensen O'Connor Johnson Kindness PLLC

(57) ABSTRACT

Embodiments are disclosed of an eye-mountable device (EMD) including a lens enclosure including an anterior layer and a posterior layer sealed to the anterior layer. An anterior electrode is disposed within the lens enclosure on a concave side of the anterior layer, a posterior electrode is disposed within the lens enclosure on a convex side of the posterior layer, and an electrochromic element is disposed across a central region of the lens enclosure, wherein the electrochromic element separates the anterior electrode from the posterior electrode within the central region.

31 Claims, 6 Drawing Sheets

(51) Int. Cl.
  *G02F 1/1333* (2006.01)
  *G02F 1/153* (2006.01)
  *B29D 11/00* (2006.01)
  *G02F 1/133* (2006.01)

(56) References Cited

U.S. PATENT DOCUMENTS

| | | | |
|---|---|---|---|
| 6,239,778 B1 | 5/2001 | Palffy-Muhoray | |
| 2003/0193709 A1* | 10/2003 | Mallya | G02F 1/1334 |
| | | | 359/245 |
| 2006/0050357 A1* | 3/2006 | Gavrilov | C09K 9/02 |
| | | | 359/265 |
| 2009/0201461 A1 | 8/2009 | Kosa et al. | |
| 2009/0204207 A1* | 8/2009 | Blum | G02C 7/08 |
| | | | 623/4.1 |
| 2010/0110372 A1* | 5/2010 | Pugh | G02C 7/083 |
| | | | 351/159.75 |
| 2012/0113496 A1* | 5/2012 | Ueda | G02F 1/153 |
| | | | 359/275 |
| 2012/0300171 A1 | 11/2012 | Gupta et al. | |
| 2013/0027655 A1* | 1/2013 | Blum | G02C 7/083 |
| | | | 349/193 |
| 2013/0141916 A1* | 6/2013 | Kobayashi | C09K 11/06 |
| | | | 362/260 |
| 2013/0335800 A1* | 12/2013 | Konkin | C08G 73/026 |
| | | | 359/265 |
| 2014/0107444 A1* | 4/2014 | Liu | A61B 5/0004 |
| | | | 600/345 |
| 2014/0276481 A1* | 9/2014 | Pugh | G02C 7/085 |
| | | | 351/158 |
| 2014/0327950 A1* | 11/2014 | Trajkovska-Broach | G02F 1/1523 |
| | | | 359/265 |
| 2015/0077658 A1* | 3/2015 | Pugh | G02C 7/04 |
| | | | 349/13 |
| 2015/0131047 A1 | 5/2015 | Saylor et al. | |
| 2015/0219974 A1 | 8/2015 | Trajkovska-Broach et al. | |
| 2015/0250584 A1 | 9/2015 | Blum et al. | |
| 2015/0261056 A1 | 9/2015 | Kumar et al. | |
| 2015/0286073 A1 | 10/2015 | Blum | |
| 2015/0362752 A1 | 12/2015 | Linhardt et al. | |
| 2016/0299357 A1* | 10/2016 | Hayashi | G02C 7/101 |
| 2017/0115512 A1* | 4/2017 | Pugh | G04G 13/02 |

* cited by examiner

ELECTROCHROMIC CONTACT LENS

TECHNICAL FIELD

The disclosed embodiments relate generally to contact lenses and in particular, but not exclusively, to electrochromic contact lenses.

BACKGROUND

Contact lenses are a widely-worn solution for vision correction. They can sometimes have color, mostly for cosmetic reasons but also for practical reasons such as making them easier to find if dropped. But the optical characteristics of existing contact lenses—their color or opacity, among other things—are usually fixed at the time of manufacture and cannot be changed later. That limits the cosmetic and functional possibilities of the contact lens.

BRIEF DESCRIPTION OF THE DRAWINGS

Non-limiting and non-exhaustive embodiments of the invention are described with reference to the following figures, wherein like reference numerals refer to like parts unless otherwise specified. Figures are not to scale unless specifically described as such.

DETAILED DESCRIPTION OF THE ILLUSTRATED EMBODIMENTS

Figure 1:
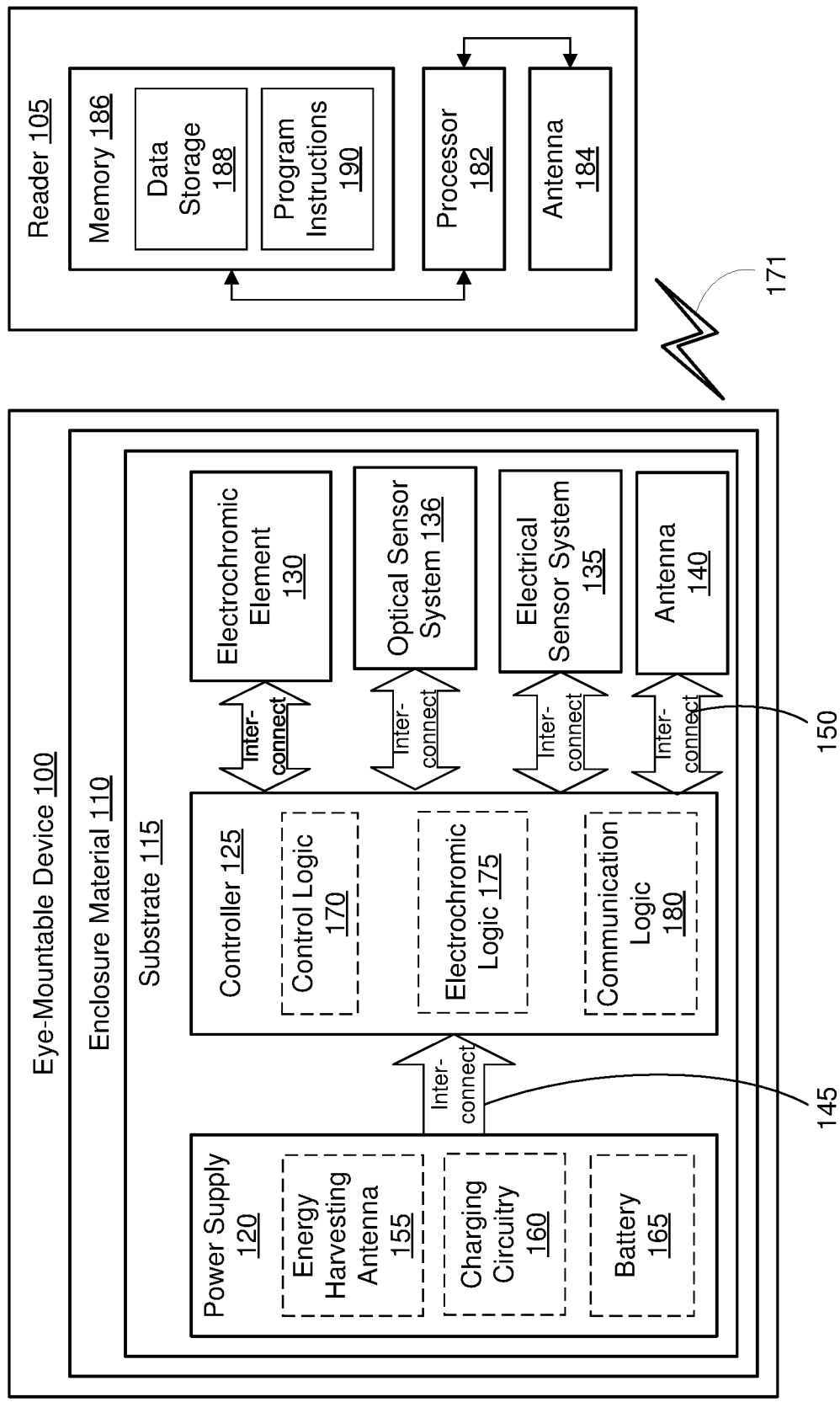
FIG. 1 is a functional block diagram of an embodiment of an eye-mountable device with electrochromic capability and an external reader for interacting with the eye-mountable device.

Embodiments are described of an apparatus, system and method for electrochromic contact lenses. Specific details are described to provide an understanding of the embodiments, but one skilled in the relevant art will recognize that the invention can be practiced without one or more of the described details or with other methods, components, materials, etc. In some instances well-known structures, materials, or operations are not shown or described in detail but are nonetheless encompassed within the scope of the invention.

References in this description to "one embodiment" or "an embodiment" mean that a described feature, structure, or characteristic can be included in at least one described embodiment. As a result, appearances of "in one embodiment" or "in an embodiment" do not necessarily refer to the same embodiment. Furthermore, the described features, structures, or characteristics can be combined in any suitable manner in embodiments other than those illustrated.

Described below is a contact lens or eye-mountable device that comprises an electrically-activated lens that includes an electrochromic layer for adjusting the opacity, color, or both, of the contact lens. Electrochromatism or electrochromism refers to a material's ability to change color in response to an electrical signal such as an applied voltage and/or current. The lenses can operate autonomously based on their on-board sensor, circuitry, logic, etc., but if necessary communication to and from the lenses can be achieved by a radio link or an optical link to an external device, such as a mobile phone or a reader designed specifically for that purpose (see, e.g., FIG. 1).

Existing contact lenses have fixed optical properties, such as color, transparency, refractive index (i.e., correction factor), opacity, etc. The disclosed embodiments are contact lenses that can electronically change their color and transparency/opacity for cosmetic or protective purposes. Compared to existing colored contact lenses, whose color and opacity are unchangeable, these lenses can change their color or opacity on demand. This can be useful for cosmetic purposes and also useful for lenses that need to filter light (e.g., sunglasses), in that the lens can be programmed directly by the user or adjusted automatically using on-lens light sensors. This is especially useful in comparison to the photochromic dyes found in current ophthalmic lenses, which cannot be changed on demand and have long switching times.

In some embodiments, the color or opacity of the contact lens can be automatically adjusted in real time. The electrochromic element is disposed in a center region of the contact lens so that at a minimum it covers at least the user's foveal vision and at a maximum their entire pupil. As such, it is desirable that structures and/or fabrication processes aid in the positioning of an electrochromic element—e.g., relative to electrodes and/or other circuitry that supports operation of the electrochromic element.

The electrochromic element can be implemented with a layer of liquid crystal (LC) material, and can require electrodes to electronically control the electrochromic element. Accordingly electrical, structural, and/or other isolation can be provided, for instance between the electrodes or between the electrochromic element and control circuitry of the eye-mounted device (EMD).

Embodiments of the eye-mountable device can include a power supply, control electronics, an electrochromic element, a light sensor, and an antenna—all embedded within a lens enclosure formed to be contact-mounted to an eye (e.g., shaped to be removably mounted to a cornea and allow eyelid motion to open and close). In one embodiment the control electronics are coupled to monitor the sensor system to identify eyelid position and ambient brightness, manipulate the electrochromic element to control the color, opacity, or both, of the eye-mountable device, and provide wireless communications with an external reader. In some embodiments, the power supply can include charging circuitry for controlling inductive wireless charging of an embedded battery.

The lens enclosure can be fabricated with a variety of materials compatible for direct contact with a human eye, such as a polymeric material, a hydrogel, PMMA, silicone based polymers (e.g., fluoro-silicon acrylate), or otherwise. The electronics can be disposed upon a ring-shaped substrate and embedded within the lens enclosure near its periphery to avoid interference with incident light received closer to the central region of the cornea. Capacitive and optical sensor systems can be arranged on the substrate to face outward towards the eyelids to detect the eyelid coverage over the sensor system and the intensity of ambient light. As the eyelids cover different portions of the sensor system, this changes a characteristic (e.g., its capacitance), which can be measured to determine eyelid position.

In some embodiments information from on-board optical sensors and electrical sensors can be used to determine the amount of color or opacity changes to be applied to the electrochromic element positioned in a central portion of the lens enclosure. The electrochromic element is coupled to the controller to be electrically manipulated thereby via the application of a voltage across a pair of electrodes. For example, the electrochromic element can be implemented with an electrochromic layer that changes its color, opacity, or both, in response to an applied electrical bias signal across the electrodes.

FIG. 1 is a functional block diagram of an embodiment of an eye-mountable device (EMD) 100 with electrochromic capability. Because EMD 100 includes electronics and is configured to be contact-mounted to an eye, it is also referred to herein as an ophthalmic electronics platform, a contact lens, or a smart contact lens.

The exposed portion of EMD 100 is a flexible lens enclosure 110 formed to be contact-mounted to a corneal surface of an eye. A substrate 115 is embedded within or otherwise surrounded by flexible lens enclosure 110 to provide a mounting surface for a power supply 120, a controller 125, an electrical sensor system 135, an optical sensor system 136, an antenna 140, and various interconnects 145 and 150. An electrochromic element 130 is embedded within flexible lens enclosure 110 and coupled to controller 125 to provide color change, opacity change, or both, to the wearer of EMD 100. The illustrated embodiment of power supply 120 includes an energy harvesting antenna 155, charging circuitry 160, and a battery 165. The illustrated embodiment of controller 125 includes control logic 170, electrochromic logic 175, and communication logic 180. The illustrated embodiment of reader 105 can communicate with EMD 100 and includes a processor 182, an antenna 184, and memory 186.

Controller 125 is coupled to receive feedback control signals from electrical sensor system 135 and optical sensor system 136, and is further coupled to operate electrochromic element 130. Power supply 120 supplies operating voltages to controller 125 and/or electrochromic element 130. Antenna 140 is operated by controller 125 to communicate information to and/or from EMD 100. In one embodiment antenna 140, controller 125, power supply 120, and sensor systems 135 and 136 are all situated on embedded substrate 115. In one embodiment electrochromic element 130 is embedded within a center region of flexible lens enclosure 110, but is not disposed on substrate 115.

To facilitate contact-mounting, flexible lens enclosure 110 can have a concave surface configured to adhere ("mount") to a moistened corneal surface (e.g., by capillary forces with a tear film coating the corneal surface). Additionally or alternatively, EMD 100 can be adhered by a vacuum force between the corneal surface and flexible lens enclosure 110 due to the concave curvature. While mounted with the concave surface against the eye, the outward-facing surface of flexible lens enclosure 110 can have a convex curvature that is formed to not interfere with eyelid motion while EMD 100 is mounted to the eye. For example, flexible lens enclosure 110 can be a substantially transparent curved disk shaped similarly to a contact lens.

Flexible lens enclosure 110 can include one or more biocompatible materials, such as those employed for use in contact lenses or other ophthalmic applications involving direct contact with the corneal surface. Flexible lens enclosure 110 can optionally be formed in part from such biocompatible materials or can include an outer coating with such biocompatible materials. Flexible lens enclosure 110 can include materials configured to moisturize the corneal surface, such as hydrogels and the like. Flexible lens enclosure 110 is a deformable ("non-rigid") material to enhance wearer comfort. In some instances, flexible lens enclosure 110 can be shaped to provide a predetermined, vision-correcting optical power, such as can be provided by a contact lens. Flexible lens enclosure 110 can be fabricated of various materials including a polymeric material, a hydrogel, PMMA, silicone based polymers (e.g., fluoro-silicon acrylate), or otherwise.

Substrate 115 includes one or more surfaces suitable for mounting sensor system 135, controller 125, power supply 120, and antenna 140. Substrate 115 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or the flexible conductive materials discussed below) can be patterned on substrate 115 to form circuitry, electrodes, etc. For example, antenna 140 can be formed by depositing a pattern of gold or another conductive material on substrate 115. Similarly, interconnects 145 and 150 can be formed by depositing suitable patterns of conductive materials on substrate 115.

A combination of resists, masks, and deposition techniques can be employed to pattern materials on substrate 115. Substrate 115 can be a relatively rigid material, such as polyethylene terephthalate ("PET") or another material sufficient to structurally support the circuitry and/or electronics within enclosure material 110. EMD 100 can alternatively be arranged with a group of unconnected substrates rather than a single substrate. For example, controller 125 and power supply 120 can be mounted to one substrate, while antenna 140 and sensor system 135 are mounted to another substrate and the two substrates can be electrically connected via interconnects.

Although the embodiments are not limited in this regard, substrate 115 can be shaped as a flattened ring (e.g., an annulus) with a radial width dimension sufficient to provide a mounting platform for the embedded electronics components. Substrate 115 can have a thickness sufficiently small to allow the substrate to be embedded in flexible lens enclosure 110 without adversely influencing the profile of EMD 100, while also having a thickness sufficiently large to provide structural stability suitable for supporting the electronics mounted thereon. For example, substrate 115 can be shaped as a ring with a diameter of about 10 millimeters, a radial width of about 1 millimeter (e.g., an outer radius 1 millimeter larger than an inner radius), and a thickness of about 50 micrometers. Substrate 115 can optionally be aligned with the curvature of the eye-mounting surface of EMD 100 (e.g., convex surface). For example, substrate 115 can be shaped along the surface of an imaginary cone between two circular segments that define an inner radius and an outer radius. In such an example the surface of substrate 115 along the surface of the imaginary cone defines an inclined surface that is approximately aligned with the curvature of the eye mounting surface at that radius.

In an embodiment power supply 120, controller 125, and substrate 115 can be positioned away from the center of EMD 100 to avoid interference with light transmission to the eye through the center of EMD 110. In contrast, electrochromic element 130 can be centrally positioned to apply color change, opacity change, or both, to the light transmitted to the eye and reflected from parts of the eye such as the iris through the center of enclosure material 110. For example, where EMD 100 is shaped as a concave-curved disk, substrate 115 can be embedded around the periphery (e.g., near the outer circumference) of the disk.

In the illustrated embodiment, power supply 120 includes a battery 165 to power the various embedded electronics, including controller 125. Battery 165 can be inductively charged by charging circuitry 160 and energy harvesting antenna 155. In one embodiment antenna 140 and energy harvesting antenna 155 are independent antennae that serve their respective functions of energy harvesting and communications, but in other embodiments energy harvesting antenna 155 and antenna 140 are the same physical antenna that are time-shared for their respective functions of inductive charging and wireless communications with reader 105. Charging circuitry 160 can include a rectifier/regulator to condition the captured energy for charging battery 165 or directly power controller 125 without battery 165. Charging circuitry 160 can also include one or more energy storage devices to mitigate high frequency variations in energy harvesting antenna 155. For example, one or more energy storage devices (e.g., a capacitor, an inductor, etc.) can be connected to function as a low-pass filter.

Controller 125 contains logic to choreograph the operation of the other embedded components. Control logic 170 controls the general operation of EMD 100, including providing a logical user interface, power control functionality, etc. Electrochromic logic 175 includes logic for monitoring feedback signals from electrical sensor system 135 and optical sensor system 136, determining the current lighting conditions and user settings, and manipulating electrochromic element 130 in response to provide the appropriate color, opacity, or both. Electrochromic changes can be implemented in real time based upon feedback from the electrical sensors 135 or optical sensor system 136. Communication logic 180 provides communication protocols for wireless communication with reader 105 via antenna 140. In one embodiment, communication logic 180 provides backscatter communication via antenna 140 when in the presence of an electromagnetic field 171 output from reader 105. In one embodiment, communication logic 180 operates as a smart wireless radiofrequency identification ("RFID") tag that modulates the impedance of antenna 140 for backscatter wireless communications. The various logic modules of controller 125 can be implemented in software/firmware executed on a general purpose microprocessor, in hardware (e.g., application specific integrated circuit), or a combination of both.

EMD 100 can also include other embedded electronics and logic modules. For example, a light source or pixel array can be included to provide visible feedback to the user. An accelerometer or gyroscope can be included to provide positional, rotational, directional, or acceleration feedback information to controller 125.

Figure 2A:
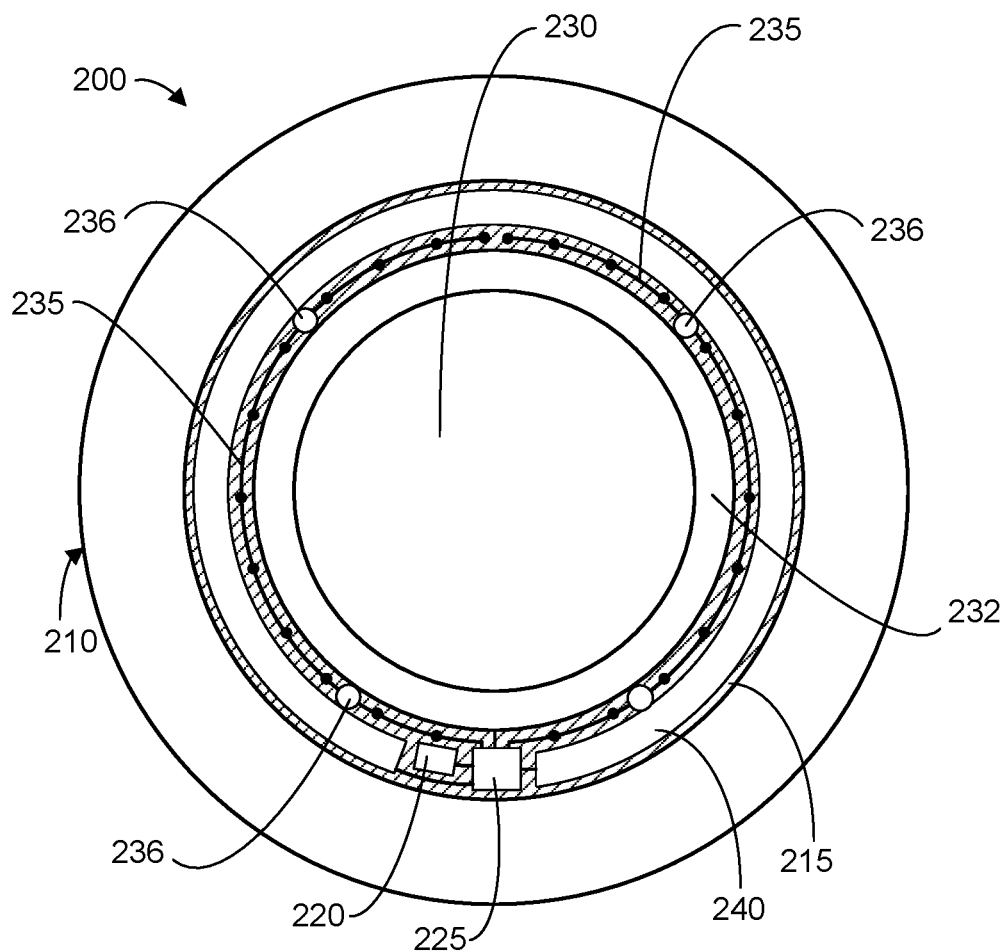
FIG. 2A is a top view illustration of an embodiment of an assembled eye-mountable device.
Figure 2B:
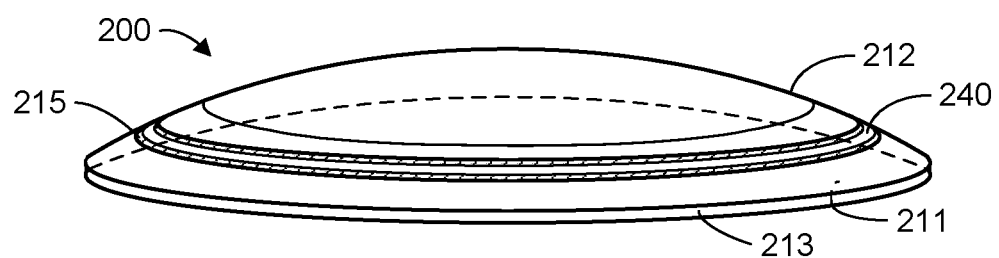
FIG. 2B is a perspective view illustration of an embodiment of an assembled eye-mountable device.

FIGS. 2A-2B illustrate two views of an embodiment of an EMD 200; FIG. 2A is a top view, FIG. 2B a perspective view. EMD 200 is one possible implementation of EMD 100. EMD 200 includes a flexible lens enclosure 210, a ring substrate 215, a power supply 220, a controller 225, an electrochromic element 230, an electrical sensor system 235, an optical sensor system 236 and an antenna 240.

Flexible lens enclosure 210 of EMD 200 is shaped as a curved disk formed with one side having a concave surface 211 suitable to fit over a corneal surface of an eye. The opposite side of the disk has a convex surface 212 that does not interfere with eyelid motion while EMD 200 is mounted to the eye. In the illustrated embodiment, a circular or oval outer side edge 213 connects the concave surface 211 and convex surface 212.

EMD 200 can have dimensions similar to a vision correction and/or cosmetic contact lens, such as a diameter of approximately 1 centimeter and a thickness of about 0.1 to about 0.5 millimeters. But these diameter and thickness values are provided for explanatory purposes only. In some embodiments the dimensions of EMD 200 are selected according to the size and/or shape of the corneal surface of the wearer's eye. Flexible lens enclosure 210 can be formed with a curved shape in a variety of ways. For example, techniques similar to those employed to form vision-correction contact lenses, such as heat molding, injection molding, cast molding, spin casting, etc. can be employed to form flexible lens enclosure 210.

Ring substrate 215 is embedded within flexible lens enclosure 210. Ring substrate 215 can be embedded so that it is positioned along the outer periphery of flexible lens enclosure 210, away from the central region where electrochromic element 230 is positioned. In the illustrated embodiment ring substrate 215 encircles electrochromic element 230 but does not interfere with vision because it is positioned away from the central region where incident light is transmitted to the light-sensing portions of the eye and, in any event, is too close to the eye to be in focus. In some embodiments ring substrate 215 can optionally be formed of a transparent material to further mitigate effects on visual perception. Ring substrate 215 can be shaped as a flat, circular ring or annulus (e.g., a disk with a centered hole). The flat surface of ring substrate 215 (e.g., along the radial width of the annulus) is a platform for mounting electronics and for patterning conductive materials to form electrodes, antenna(e), and/or interconnections.

In some embodiments sensor system 135 includes one or more discrete capacitance sensors that are peripherally distributed to sense the eyelid overlap. Electrical sensor system 235 is distributed about EMD 200 to sense eyelid overlap in a manner similar to capacitive touch screens. In the illustrated embodiment, electrical sensor system 235 is formed by a series of parallel coupled discrete capacitive elements, but other implementations can be used. By monitoring feedback signals from electrical sensor system 235 the amount and position of eyelid overlap can be measured by controller 225.

EMD 200 also includes an optical sensor system that includes several optical sensors 236 positioned around a ring substrate 215. Optical sensors 236 can be used to measure the amount of ambient light incident on the lens, as well as the amount of light reflected through the lens in the opposite direction from various parts of the eye such as the pupil or iris. Optical sensors 236 can be used to sense the intensity of ambient light and provide signals to control their 225 that will allow the control of the darkened, lightning, or change the color of electrochromic element 230 accordingly. In some embodiments optical sensors 236 and electrical sensor 235 can work with controller 225 to optimize the performance of EMD 200. For instance, capacitive system 235 can be used to detect when the eyelids are closed, at which time controller 225 can turn off the signal to the electrochromic element 230 to conserve power. In another embodiment, optical sensors 236 and electrical sensors 235 can work together to distinguish a long-term closure of the eyelids from a blink.

Electrochromic element 230 is centrally positioned within flexible lens enclosure 210 to affect the color, opacity, or both, of EMD 200 in the user's center of vision. A sealing or insulating region 232 can be disposed between electrochromic element 230 and ring substrate 215 to provide electrical isolation from at least some circuitry of ring substrate 215. In various embodiments (see, e.g., FIGS. 4-5), electrochromic element 230 includes an element that changes its color, opacity, or both, under the influence of flexible conductive electrodes manipulated by controller 225. Electrochromic element 230 can be implemented using a variety of different optoelectronic elements as shown, for instance, in FIGS. 4-5.

Figure 3:
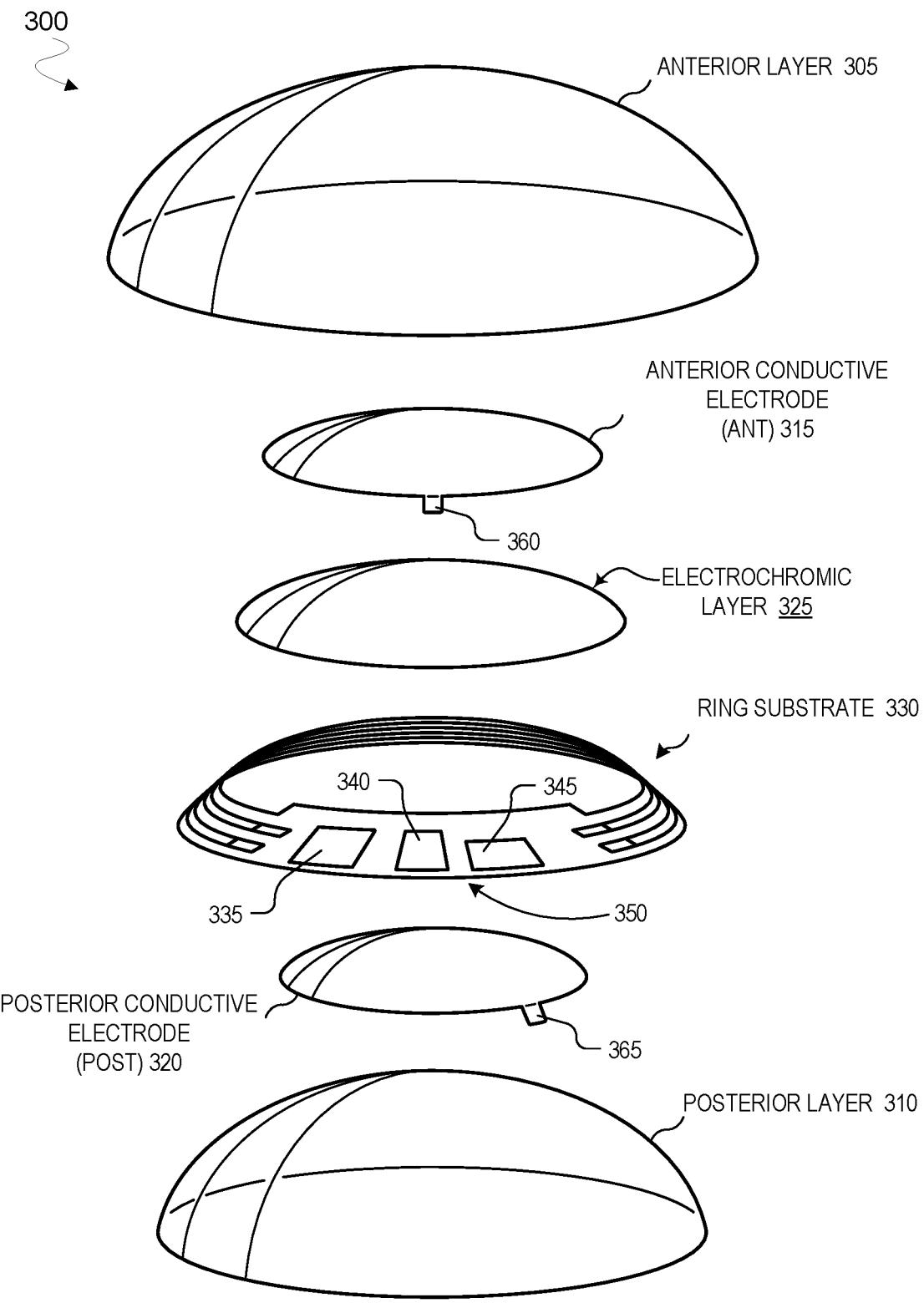
FIG. 3 is an exploded perspective view that illustrates the components and layers of an embodiment of an eye-mountable device.

FIG. 3 is an exploded perspective view illustrating an embodiment of an EMD 300. EMD 300 is one possible implementation of EMDs 100 or 200, but the exploded perspective shows additional details of various components. The illustrated embodiment of EMD 300 includes a flexible lens enclosure including an anterior layer 305, a posterior layer 310, an anterior flexible conductive electrode (ANT) 315, a posterior flexible conductive electrode (POST) 320, an electrochromic layer 325, a ring substrate 330, a power supply 335, a controller circuit 340, an anterior contact pad 345, and a posterior contact pad 350 (hidden in FIG. 3). Together ANT 315, electrochromic layer 325, and POST 320 form an electrochromic element that is under the control of controller circuit 340. The illustrated embodiment of ANT 315 includes a connection tab 360 and the illustrated embodiment of POST 320 includes a connection tab 365. Tabs 360 and 365 are used to provide electrical connection between the electrodes in the ring substrate. They can be radially offset from each other in one embodiment, or circumferentially offset in other embodiments.

ANT 315 and POST 320 are transparent electrodes that electrically manipulate electrochromic layer 325 via the application of a voltage and/or current across the electrodes. ANT 315 and POST 320 are flexible conductors that substantially maintain their conductivity even in the presence of cyclical mechanical stress including folding and bending. ANT 315 and POST 320 can be formed from an optically transparent but electrically conductive material that is cured onto, and therefore conforms to, the curved surfaces of anterior layer 305 and posterior layer 310, respectively.

ANT 315 and POST 320 can be applied to anterior layer 305 and posterior layer 310, respectively, using various techniques. For instance, a conductive material including conductive epoxy, conductive polymer, conductive silicon, evaporated metal or other conductive material can be spray coated, stamped, shadow masked or otherwise disposed to form electrode structures to operate an electrochromic element. In one embodiment the conductive material is spray coated on the inside concave surface of anterior layer 305 using a conforming concave stencil and is also spray coated on the inside convex surface of posterior layer 310 using a conforming convex stencil. In other embodiments, the spray coating can be actively controlled without use of stencils, or applied after application of a temporary mask. In yet other embodiments, the conductive material is coated onto a stamp with a conforming shaped surface that is then pressed to anterior layer 305 or posterior layer 310 to transfer the conductive material. Other application techniques can also be used to form and position ANT 315 and POST 320 onto anterior layer 305 and posterior layer 310, respectively. In one embodiment, ANT 315 and POST 320 are formed to achieve a desired total sheet resistance. Target sheet resistances can range between 100 ohms/square to 2000 ohms/square (e.g., 190 ohms/square). Of course, other target sheet resistances outside this range can also be used.

Electrochromic layer 325 is disposed between anterior layer 305 and posterior layer 310 in a central region of EMD 300. Formation of electrochromic layer 325 can include spraying, spinning, masking, stamping, stenciling, and/or other operations adapted from conventional fabrication techniques. In an embodiment, electrochromic layer 325 is isolated electrically from at least some circuitry of ring substrate 325. Embodiments of an electrochromic layer 325 are discussed below in connection with FIGS. 4-5.

Figure 4:
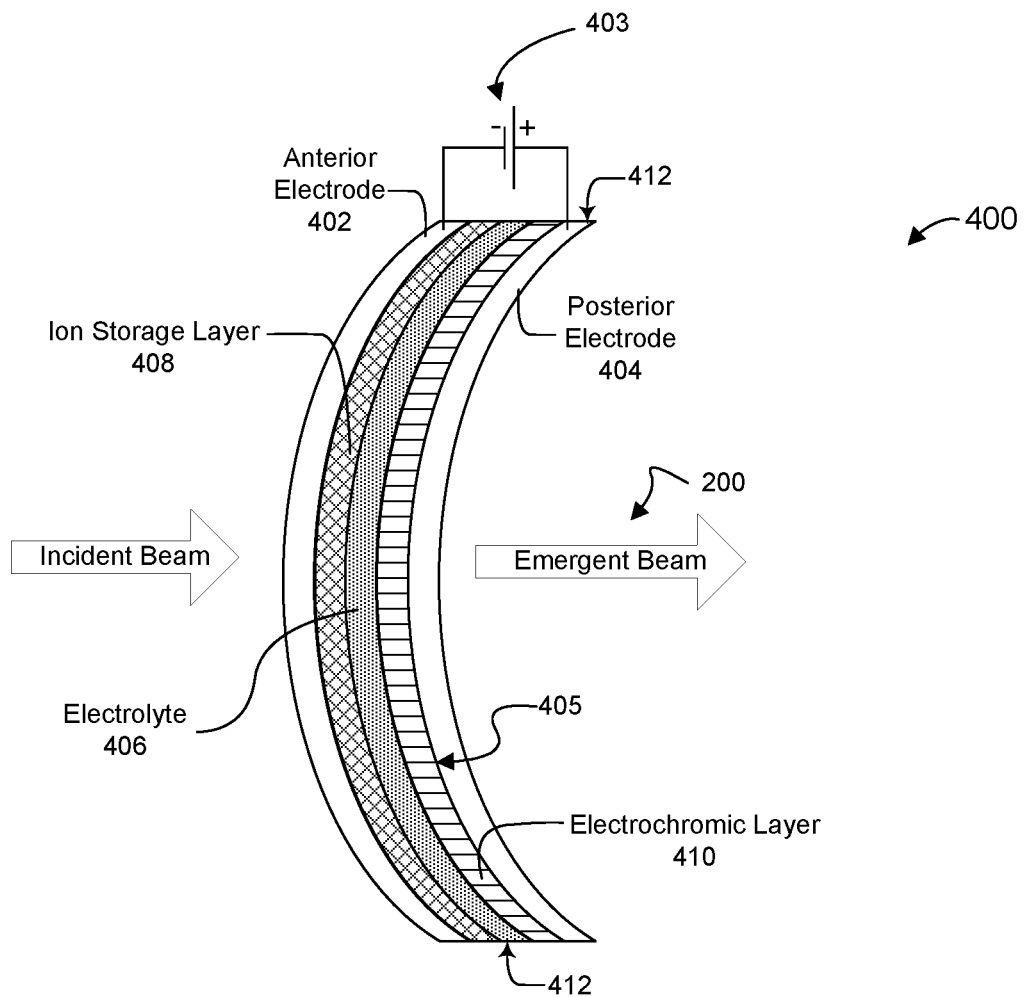
FIG. 4 is a cross-sectional view of an embodiment of an electrochromic element that can be used in the eye-mountable device of FIG. 3.

FIG. 4 illustrates a cross-sectional view of an embodiment of an electrochromic element 400 usable in EMDs 100-300. Electrochromic element 400 is a transmissive electrochromic element, meaning that it transmits light instead of reflecting it. Element 400 includes an anterior electrode 402 and a posterior electrode 404. A three-part electrochromic assembly 405 is sandwiched between the electrodes 402 and 404. In the illustrated embodiment anterior electrode 402 corresponds to ANT 315 and posterior electrode 404 corresponds to POST 320. The construction of ANT 315 and POST 320, and hence the construction of anterior electrode 402 and posterior electrode 404, are discussed in detail above in connection with FIGS. 2-3.

Anterior electrode 402 and posterior electrode 404 are electrically coupled to voltage source 403, which can be an alternating current (AC) source or a direct current (DC) source and can have a controllable voltage and current. In EMD 200, for instance, power supply 220 can correspond to voltage source 403. Electrochromic assembly 405 operates using a direct current (DC) voltage, typically less than 5 V, but draw higher currents than other technologies, typically a few milliamps.

Three-part electrochromic assembly 405 is sandwiched between anterior electrode 402 and posterior electrode 404. Electrochromic assembly 405 includes an electrolyte layer 406 sandwiched between two electrochromic layers: an ion storage layer 408 and an electrochromic layer 410. Electrolyte layer 406 can be a liquid or gel or can be a solid; when solid electrochromic assembly 405 is referred to as a solid-state electrochromic assembly. Whether solid or not, electrolyte layer 406 can be organic or inorganic. Examples of inorganic solid electrolyte layers include tantalum oxide (nominally $Ta_2O_5$) and zirconium oxide (nominally $ZrO_2$). Examples of liquid or gel electrolyte layers can include any kind of optically transparent electrolyte. In an embodiment of electrochromic assembly 405 that includes a liquid or gel electrolyte layer 406, it might be necessary to seal edges 412 to prevent the liquid electrolyte from escaping. Edges 412 can be sealed, for instance, by crimping together excess electrode material at the edges.

Ion storage layer 408 and electrochromic layer 410 conduct ions and electrons and are mixed conductors that can change color, opacity, or both in response to an applied electric field. Examples of materials that can be used for ion storage layer 408 include cerium oxide (nominally $CeO_2$), titanium oxide (nominally $TiO_2$), or a cerium oxide/zirconium oxide (e.g., $CeO_2/ZrO_2$) mixture. Electrochromic materials come in many forms: polymers, electrowetting, photonic crystals, liquid crystals, quantum dot technologies. Specific examples of materials that can be used for electrochromic layer 410 include transition metal oxides, Prussian blue, phthalocyanines, viologens, fullerenes, dyes and conducting polymers, including gels.

When no voltage is applied to anterior electrode 402 and posterior electrode 404, meaning that no electric field is applied to electrochromic assembly 405, incident light passes straight through electrochromic element 400 substantially without change to its color or brightness. In other words, the emergent beam has substantially the same color and intensity as the incident beam. But when a voltage is applied across anterior electrode 402 and posterior electrode 404, ions travel from ion storage layer 408 across electrolyte layer 406 to electrochromic layer 410, whereupon electrochromic assembly 405 changes color, opacity, or both. As a result, when an electric field is applied the emergent beam will have a lower intensity (i.e., it will be dimmer) than the incident beam, a different color than the incident beam, or both.

Figure 5:
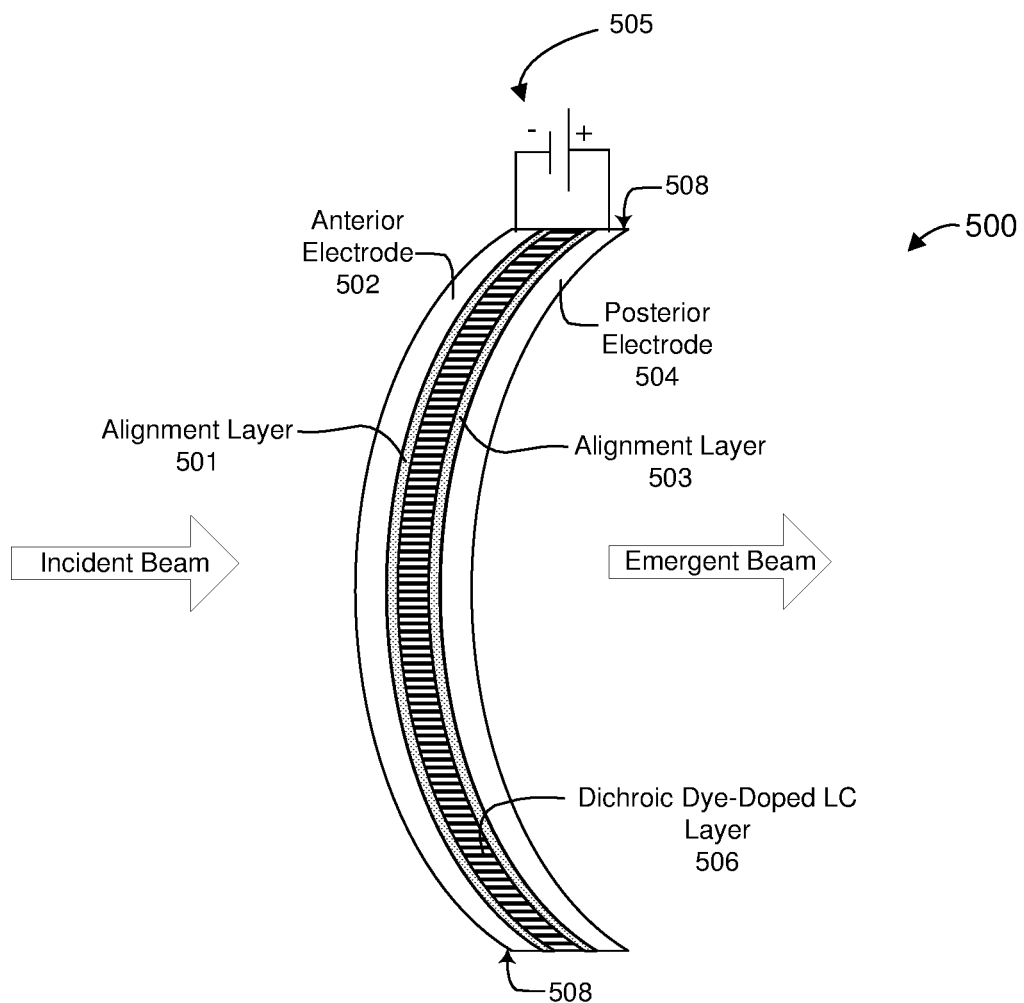
FIG. 5 is a cross-sectional view of another embodiment of an electrochromic element that can be used in the eye-mountable device of FIG. 3.

FIG. 5 illustrates a cross-sectional view of another embodiment of an electrochromic element 500 usable in EMDs 100-300. Electrochromic element 500 is a transmissive electrochromic element and includes an anterior electrode 502, a posterior electrode 504. Alignment layers 501 and 503 are sandwiched between electrodes 502 and 504, with anterior alignment layer 501 along the inner surface of anterior electrode 502 and posterior alignment layer 503 along the inner surface of posterior electrode 504. A dichroic dye-doped liquid crystal (LC) layer 506 is in turn sandwiched between alignment layers 501 and 503. Although the illustrated embodiment has two alignment layers, other embodiments could use one or none.

In the illustrated embodiment electrodes 502 and 504 correspond to ANT 315 and POST 320 in EMD 300: anterior electrode 502 corresponds to ANT 315 and posterior electrode 504 corresponds to POST 320. Anterior electrode 502 and posterior electrode 504 are electrically coupled to voltage source 505, which can be an alternating current (AC) source or a direct current (DC) source and can have a controllable voltage and current. In EMD 300, for instance, power source 220 can correspond to voltage source 505. The construction of ANT 315 and POST 320, and hence the construction of anterior electrode 502 and posterior electrode 504 are discussed above in connection with FIGS. 2-3.

Electrochromic dichroic dye-doped LC layer 506 is sandwiched between alignment layers 501 and 503. In one embodiment, dichroic dye-doped LC layer 506 uses a dichroic dye-doped liquid crystal (LC). As a result, only a single layer of dynamic material (i.e., material that changes under the influence of an applied voltage) is required and no polarizing films are required. In one embodiment, the electrochromic layer 506 can comprise a nematic liquid crystal host with a negative dielectric anisotropy that is homeotropically (vertically) aligned. EC liquid crystal systems are made by doping a dichroic dye guest into a liquid crystal host. The dichroic dye S-428 (Mitsui Chemicals, Japan) is a suitable guest candidate as it has fairly uniform absorption over the visible spectrum and turns a normally colorless liquid crystal gray. Commercially available liquid crystalline materials can be used as the host, including, but not limited to: E7, BL111, MLC-2140, and MLC-2079, all available from Merck/EMD performance materials.

One or both of alignment layers 501 and 503 can have a thickness of 10 nm to 10 microns, although embodiments are not limited to these thicknesses. Alignment layers 501 and 503 can comprise polyimide or other suitable material to provide for changing an alignment of liquid crystal molecules in dichroic dye-doped LC layer 506. Although the illustrated embodiment of electrochromic element 500 has two alignment layers, anterior 501 and posterior 503, other embodiments could use one or none.

In operation of electrochromic element 500, when no voltage is applied to anterior electrode 502 and posterior electrode 504—meaning that no voltage or current is applied to dichroic dye-doped LC layer 506—both the LC molecules and the dye molecules are aligned perpendicular to the surface of the lens and the wearer will be looking down the long axis of the dye molecules where the optical absorption will be at its minimum value. Incident light thus passes straight through the electrochromic element substantially without change to its color brightness; in other words, the emergent beam has substantially the same color and intensity as the incident beam.

But when an AC voltage waveform is applied to electrodes 502 and 504, the LC molecules will rotate and carry the dye molecules along with them. As the magnitude of the applied voltage increases so too will the rotation angle of the LC and dye molecules, until they are approximately parallel to the surface of the lens. In this orientation optical absorption will be at a maximum value and electrochromic element 500 will act as a sun lens. A device constructed this way allows a user to continuously tune the optical absorption between the minimum and maximum values by varying the applied voltage. These liquid crystal-based electrochromic elements operate with AC voltage waveforms with amplitudes between 2 and 10 volts (4-20 Vp-p) at frequencies above 50 Hz. Current draw is typically in the nano-amp (nA) to micro-amp (μA) range so they have very low power consumption.

Figure 6:
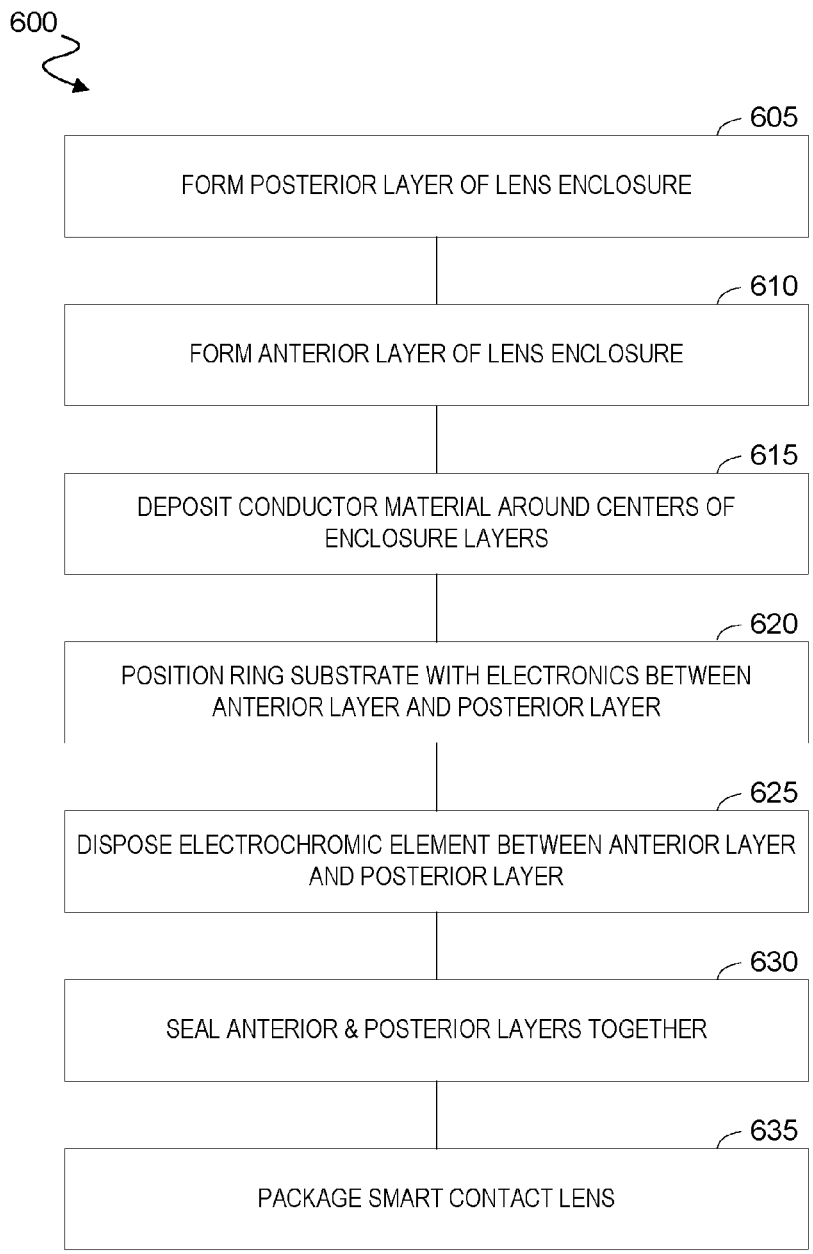
FIG. 6 is a flowchart illustrating an embodiment of a process for fabricating an eye-mountable device with an electrochromic element.

FIG. 6 is a flowchart illustrating an embodiment of a process 600 for fabricating an EMD such as EMDs 100, 200, or 300. The process blocks are shown in a particular order, but other embodiments of process 600 can execute the illustrated steps, and additional steps if any, in a different order than shown or even in parallel. Process 600 is described with reference to EMD 300, but the description can be extended to additionally or alternatively apply to fabrication of any other EMD.

At blocks 605 and 610, anterior layer 305 and posterior layer 310 are formed as separate layers of a lens enclosure. Anterior layer 305 and posterior layer 310 can be formed using molds that are spray coated or injected with a flexible, transparent material. The flexible, transparent material that can be used include any of a polymeric material, a hydrogel, PMMA, silicone based polymers (e.g., fluoro-silicon acrylate), or otherwise. Anterior layer 305 and/or posterior layer 310 can be treated to form reactive surfaces for improved bonding to the ANT 315 and POST 320. For example, anterior layer 305 and posterior layer 310 can be plasma treated in a highly ionizing environment that causes the inside surfaces of anterior layer 305 and posterior layer 310 to be chemically reactive.

At block 615 a conductor that forms ANT 315 and POST 320 is deposited onto the concave surface of anterior layer 305 and also deposited onto the convex surface of posterior layer 310. In one embodiment the deposition of the liquid conductor material can be spray coated over stencils that conform to the concave and convex surfaces, but in other embodiments the liquid conductive material is applied to stamps with curved surfaces that conform to the concave and convex surfaces of anterior layer 305 and posterior layer 310, respectively. The coated stamps can then be pressed against the inside surfaces of anterior layer 305 and posterior layer 310 to transfer the ink pattern thereto. After the liquid conductor material is applied it can be cured and/or annealed with heat, for example.

The conductor material used for ANT 315 and POST 320 can include a conductive epoxy (e.g., any of various conductive silicones), evaporated metal (gold, aluminum), a colloidal solution of conductive particles (e.g., nanotubes or nanowires) and/or the like. Depositing the conductor material can include forming any of a variety of conductive structures including, but not limited to, one or more gold wires, silver nanowires, an indium tin oxide thin film, etc. In some embodiments various solvents (e.g., alcohol), surfactants, or dilutants can be added to the liquid conductor material to improve the uniform coating and adhesion of ANT 315 and POST 320 to anterior layer 305 and posterior layer 310, respectively.

Next, at block 620 ring substrate 330, including power supply 335 and controller circuit 360, is positioned between the anterior layer 305 and the posterior layer 310 including positioning the substrate over the convex surface of posterior layer 310. Before or during positioning at block 620, a conductive adhesive can be applied to contact pads on ring substrate 330 in preparation for electrical coupling of ring substrate 330 to one or both of ANT 315 and POST 320. The positioning of ring substrate 330 at block 620 can include aligning connection tabs 360 and 365 with a respective contact pad of ring substrate 330—e.g., where connection tabs 360 and 365 are radially or circumferentially offset from each other.

At block 625, an electrochromic element is disposed between the anterior layer and the posterior layer, and at block 630 the two halves (anterior layer 305 and posterior layer 310) of the lens enclosure are pressed together and sealed. For example, an amount of enclosure material can be added between anterior layer 305 and posterior layer 310 in a region around a circumference of electrochromic layer 325. Curing of this material between the anterior and posterior layers can result in a sealing region around the electrochromic element. In one embodiment, more enclosure material is also added to the bottom edge or rim of the mated anterior layer 305 and posterior layer 310 to form the seal. Curing of this additional enclosure material can seal the substrate in a peripheral region between anterior layer 305 and posterior layer 310. Finally, at process block 635 the eye-mountable device or smart contact lens is packaged into a sealed container of lens solution for distribution.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

The invention claimed is:

1. An eye-mountable device (EMD) comprising:
a lens enclosure including an anterior layer and a posterior layer sealed to the anterior layer;
a substrate disposed within the lens enclosure in a peripheral region of the lens enclosure, the substrate having a central hole aligned with a central region of the lens enclosure;
an anterior electrode disposed within the lens enclosure on a concave side of the anterior layer and extending at least partially across the central hole;
a posterior electrode disposed within the lens enclosure on a convex side of the posterior layer and extending at least partially across the central hole; and
an electrochromic element disposed across the central region of the lens enclosure within the central hole, wherein the electrochromic element separates the anterior electrode from the posterior electrode within the central region;
a sealing region disposed between the electrochromic element and an interior edge of the substrate that forms the central hole, wherein the sealing region is electrically insulating and extends around the electrochromic element to electrically isolate the electrochromic element from circuitry disposed on the substrate; and
a secondary sealing region extending from a rim of the lens enclosure towards the substrate such that the sealing region and the secondary sealing region collectively seal the substrate within the peripheral region between the posterior layer and the anterior layer.

2. The EMD of claim 1 wherein the electrochromic element comprises a liquid crystal material with a guest dye.

3. The EMD of claim 2 wherein the electrochromic element further comprises one or both of an anterior alignment layer between the anterior electrode and the liquid crystal material and a posterior alignment layer between the posterior electrode and the liquid crystal material.

4. The EMD of claim 2 wherein the guest dye is a dichroic dye.

5. The EMD of claim 2 wherein the electrochromic element is operated with an alternating current (AC) voltage having an amplitude between 2 volts and 10 volts.

6. The EMD of claim 5 wherein the AC voltage waveform has a frequency equal to or greater than 50 Hz.

7. The EMD of claim 1 wherein the electrochromic element includes an electrolyte layer comprising a solid organic or inorganic material.

8. The EMD of claim 7 wherein the electrolyte layer is inorganic and comprises tantalum oxide (Ta2O5) or zirconium oxide (ZrO2).

9. The EMD of claim 1 wherein the electrochromic element includes an electrolyte layer comprising a liquid or a gel.

10. The EMD of claim 1 wherein the electrochromic element is operated with a direct current (DC).

11. The EMD of claim 10 wherein the direct current has a voltage less than or equal to 5 volts.

12. The EMD of claim 1, further comprising a controller disposed on the substrate to operate the electrochromic element by application of a voltage across the anterior electrode and the posterior electrode.

13. The EMD of claim 12 wherein:
the anterior electrode is shaped to include an anterior main body portion that extends at least partially across the central hole of the substrate and an anterior connection tab that extends from the anterior main body portion at least partially across the substrate;
the posterior electrode is shaped to include a posterior main body portion that extends at least partially across the central hole of the substrate and a posterior connection tab that extends from the posterior main body portion at least partially across the substrate; and
the anterior connection tab and the posterior connection tab are coupled to the controller on the substrate.

14. The EMD of claim 13 wherein the anterior connection tab and the posterior connection tab are rotationally offset from each other and wherein the anterior connection tab is coupled to an anterior contact pad on an anterior side of the substrate and the posterior connection tab is coupled to a posterior contact pad on a posterior side of the substrate.

15. A method of fabricating an electrochromic contact lens, the method comprising:
forming an anterior electrode on an anterior layer of enclosure material, including depositing a first liquid conductor material onto an concave surface of the anterior layer;
forming a posterior electrode on a posterior layer of enclosure material, including depositing a second liquid conductor material onto a convex surface of the posterior layer;
disposing an electrochromic element between the anterior layer and the posterior layer;
positioning a substrate between the concave surface and the convex surface, wherein the substrate includes a central hole and integrated circuitry disposed on the substrate; and
sealing the anterior layer to the posterior layer to form a lens enclosure that encases the anterior and posterior electrodes, the electrochromic element, and the substrate, wherein the electrochromic element is disposed between the anterior electrode and the posterior electrode within the central region, and wherein the substrate is disposed between the anterior layer and the posterior layer in a peripheral region of the lens enclosure, wherein sealing the anterior layer to the posterior layer includes forming a sealing region and a secondary sealing region, wherein the sealing region is disposed between an interior edge of the substrate that forms the central hole and the electrochromic element, wherein the secondary sealing region extends from a rim of a lens enclosure such that the sealing region and the secondary sealing region collectively seal the substrate within the peripheral region between posterior layer and the anterior layer, and wherein the sealing region is electrically insulating and extends around the electrochromic element to electrically isolate the electrochromic element from the substrate and the integrated circuitry.

16. The method of claim 15 wherein the electrochromic element comprises a liquid crystal material with a guest dye.

17. The method of claim 16, further comprising forming one or both of an anterior alignment layer between the anterior electrode and the liquid crystal material and a posterior alignment layer between the posterior electrode and the liquid crystal material.

18. The method of claim 16 wherein the guest dye is a dichroic dye.

19. The method of claim 15 wherein the electrochromic element includes an electrolyte layer comprising a solid organic or inorganic material.

20. The method of claim 19 wherein the electrolyte layer is inorganic and comprises tantalum oxide (Ta2O5) or zirconium oxide (ZrO2).

21. The method of claim 15 wherein the electrochromic element includes an electrolyte layer comprising a liquid or a gel.

22. The method of claim 15, further comprising forming a controller on a substrate to operate the electrochromic element by application of a voltage across the anterior electrode and the posterior electrode.

23. The method of claim 22 wherein:
forming the anterior electrode includes forming an anterior main body portion and an anterior connection tab that extends from the anterior main body portion;
forming the posterior electrode includes forming a posterior main body portion and a posterior connection tab that extends from the posterior main body portion; and
the anterior connection tab and the posterior connection tab are coupled to the controller.

24. The method of claim 23 wherein the anterior connection tab and the posterior connection tab are rotationally offset from each other.

25. The method of claim 15, further comprising sealing together respective edges of the anterior layer and the posterior layer around the peripheral region.

26. The EMD of claim 1, wherein the electrochromic element includes an ion storage layer comprising at least one of a cerium oxide layer, a titanium oxide layer, or a cerium oxide and zirconium oxide mixture layer, and wherein the electrochromic element includes an electrochromic material layer including at least one of a liquid crystal, a polymer, an electrowetting material, or quantum dots.

27. The EMD of claim 1, further comprising:
an electrical sensor system including a plurality of discrete capacitance sensors coupled to the electrochromic element to provide real-time adjustment of at least one of color or opacity of the electrochromic element in response to feedback signals of the electrical sensor system, and wherein the plurality of discrete capacitance sensors are coupled together in series or parallel.

28. The EMD of claim 27, further comprising:
an antenna disposed on the substrate, wherein the plurality of discrete capacitance sensors of the electrical sensor system are disposed on the substrate between the interior edge of the central hole of the substrate and the antenna.

29. The EMD of claim 27, further comprising:
a controller coupled to the electrical sensor system, the electrochromic element, and memory, wherein the memory stores instructions that when executed by the controller causes the EMD to perform operations including:
monitoring the feedback signals from the electrical sensor system to determine at least one of an amount or position of eyelid overlap;
determining whether an eyelid is closed from the feedback signals based on the monitoring; and
in response to determining the eyelid is closed, conserving power by turning off an electrical signal powering the electrochromic element.

30. The EMD of claim 29, further comprising:
an optical sensor system including one or more optical sensors to provide measurements of an intensity of ambient light incident upon the EMD, wherein the feedback signals include the measurements provided by the optical sensor system.

31. The EMD of claim 2, wherein the anterior electrode, the posterior electrode, and the electrochromic element form an electrochromic stack that does not include a polarizing film, and wherein the liquid crystal material has negative dielectric anisotropy.

* * * * *